(12) United States Patent
Sato

(10) Patent No.: US 9,077,825 B2
(45) Date of Patent: Jul. 7, 2015

(54) INFORMATION PROCESSING SYSTEM COMPRISING A SERVER APPARATUS AND AN INFORMATION PROCESSING APPARATUS CONSTRUCTING AN OPERATION SCREEN, CONTROL METHOD AND PROGRAM THEREOF

(75) Inventor: Tomoya Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 438 days.

(21) Appl. No.: 13/148,164

(22) PCT Filed: Apr. 13, 2011

(86) PCT No.: PCT/JP2011/059669
§ 371 (c)(1),
(2), (4) Date: Aug. 5, 2011

(87) PCT Pub. No.: WO2011/152143
PCT Pub. Date: Dec. 8, 2011

(65) Prior Publication Data
US 2012/0057194 A1 Mar. 8, 2012

(30) Foreign Application Priority Data
Jun. 3, 2010 (JP) ................................. 2010-128274

(51) Int. Cl.
*G06F 3/12* (2006.01)
*H04N 1/00* (2006.01)

(52) U.S. Cl.
CPC .......... *H04N 1/00244* (2013.01); *H04N 1/0044* (2013.01); *H04N 1/00464* (2013.01); *H04N 2201/0046* (2013.01); *H04N 2201/0094* (2013.01)

(58) Field of Classification Search
CPC .................. H04N 1/00244; H04N 2201/3249; H04N 21/8586; G06F 17/30194
USPC ............... 358/1.15, 1.14, 1.13; 709/203, 217, 709/201, 219; 707/609, 661
See application file for complete search history.

(56) References Cited

U.S. PATENT DOCUMENTS

| 8,018,610 B2 | 9/2011 | Mathieson et al. .......... 358/1.15 |
| 2005/0206952 A1* | 9/2005 | Hikawa ........................ 358/1.15 |

(Continued)

FOREIGN PATENT DOCUMENTS

| CN | 1673994 A | 9/2005 |
| CN | 101247459 A | 8/2008 |

(Continued)

OTHER PUBLICATIONS

Aug. 4, 2014 Chinese Official Action in Chinese Patent Appln. No. 201180026368.X.

*Primary Examiner* — Jacky X Zheng
(74) *Attorney, Agent, or Firm* — Fitpatrick, Cella, Harper & Scinto

(57) ABSTRACT

There are provided an information processing system which constructs an operation screen using data present in an information processing apparatus without transmitting the data to a server apparatus when the server apparatus provides the operation screen of the information processing apparatus, and a control method thereof. To accomplish this, in the information processing system, when a Web server constructs the operation screen of an external application using data stored in an MFP, only storage destination information of the data is transmitted/received between the Web server and the MFP without transmitting/receiving the data.

7 Claims, 13 Drawing Sheets

(56) References Cited

U.S. PATENT DOCUMENTS

| | | | |
|---|---|---|---|
| 2006/0017967 A1* | 1/2006 | Asami et al. | 358/1.15 |
| 2008/0170271 A1* | 7/2008 | Lee | 358/402 |
| 2009/0238364 A1* | 9/2009 | Furukawa et al. | 380/243 |
| 2009/0296133 A1* | 12/2009 | Kawabushi et al. | 358/1.15 |
| 2010/0122319 A1* | 5/2010 | Nakashima | 726/2 |
| 2010/0208295 A1 | 8/2010 | Sato | |
| 2011/0173250 A1 | 7/2011 | Sato | |

FOREIGN PATENT DOCUMENTS

| | | |
|---|---|---|
| JP | 2005-275478 | 10/2005 |
| JP | 2006-127503 | 5/2006 |
| JP | 2010-113599 | 5/2010 |
| KR | 10-2010-0051545 A | 5/2010 |

\* cited by examiner

FIG. 2
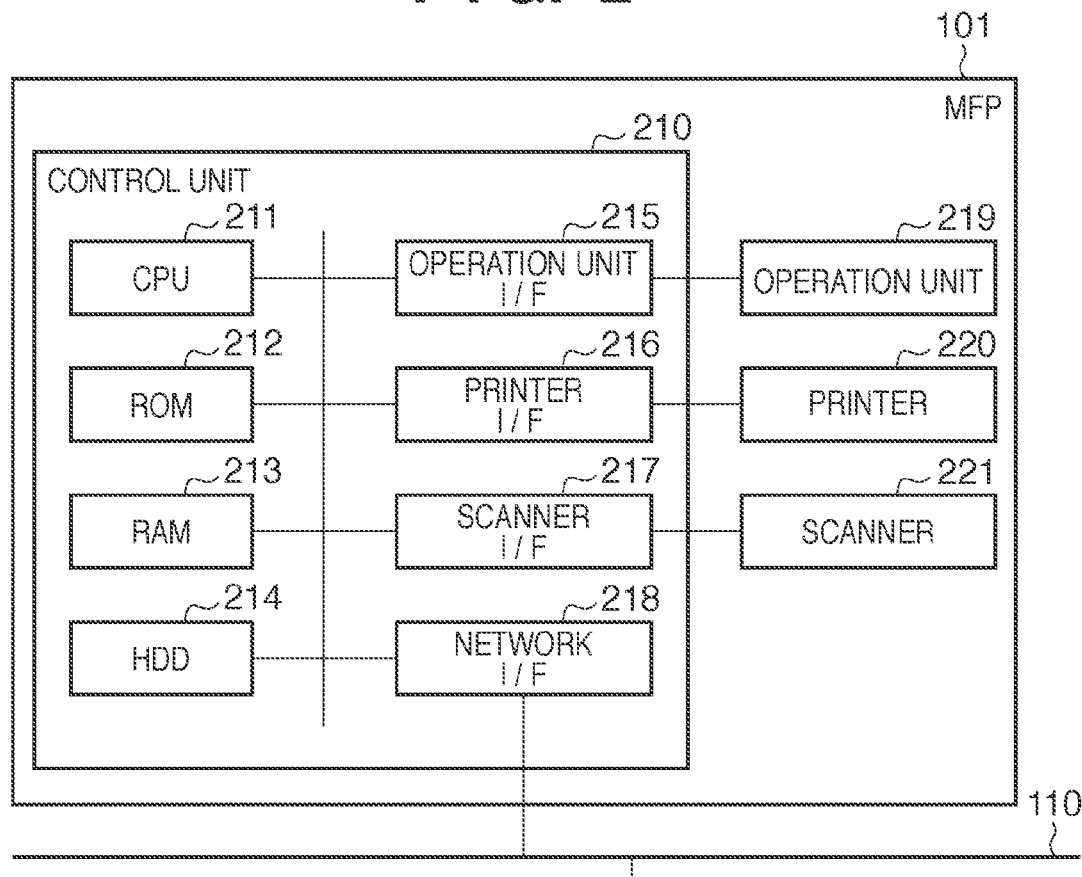
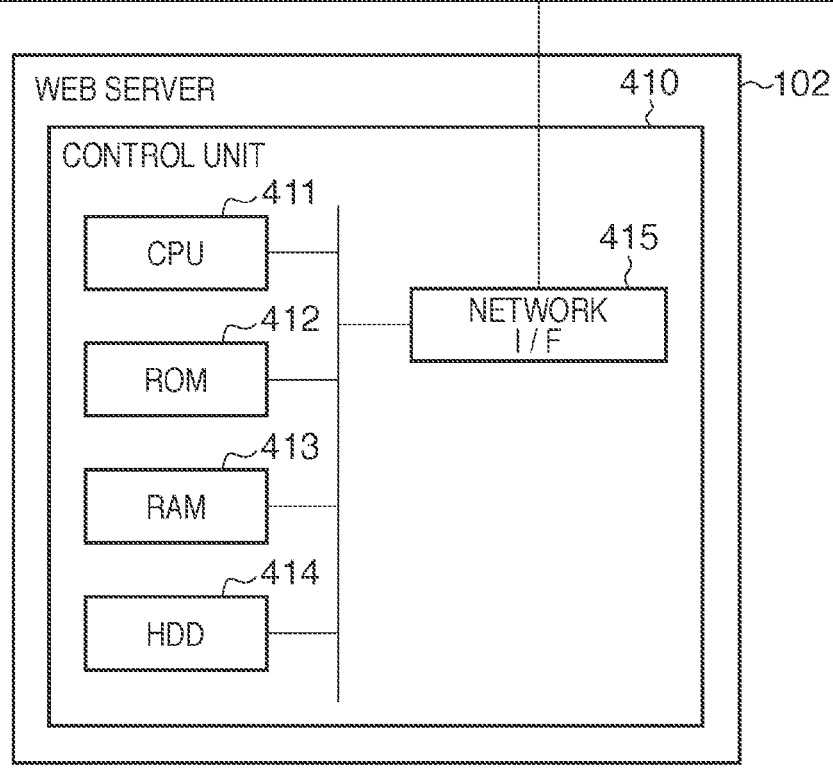

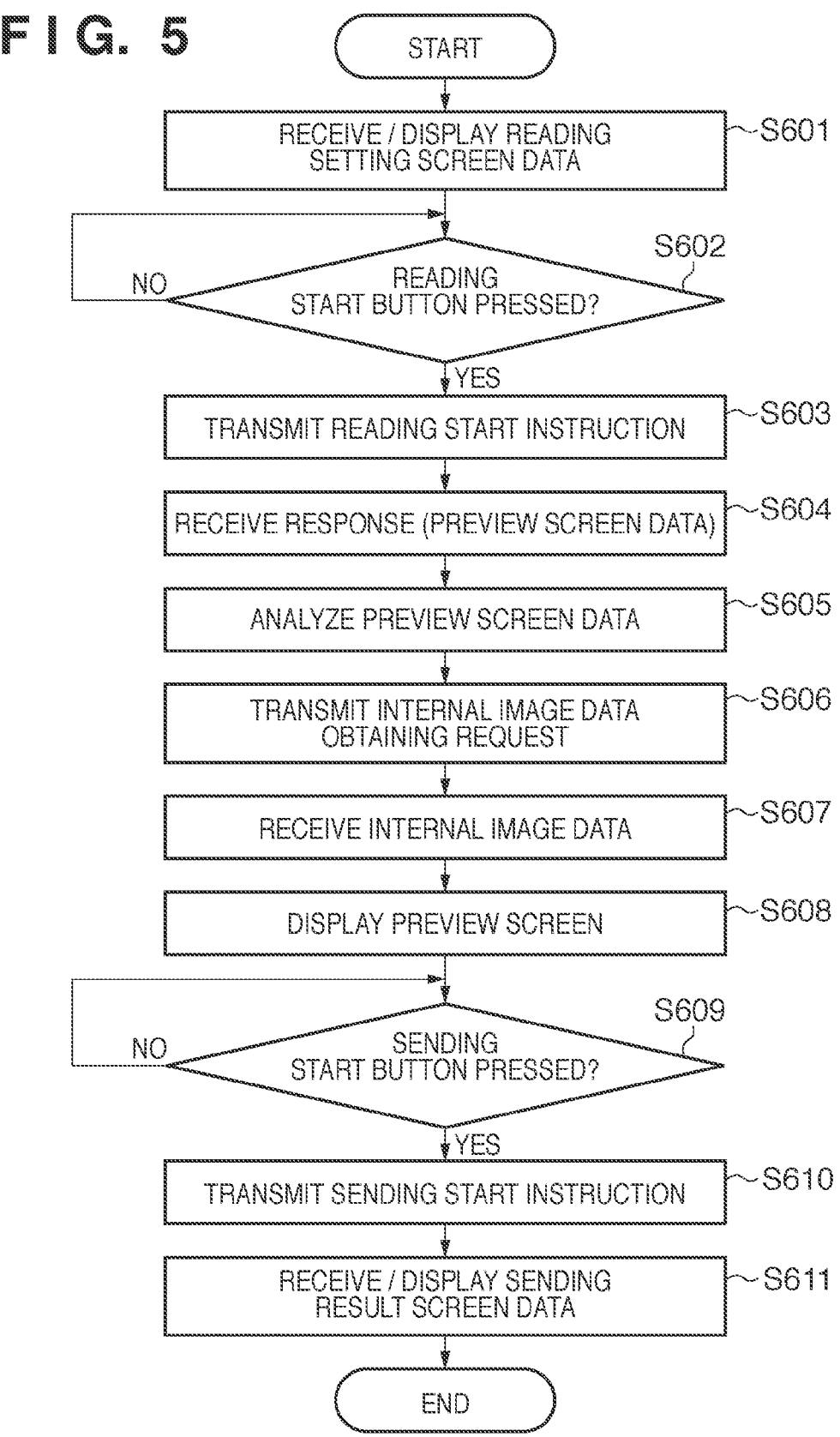

FIG. 6

```
<html>
    <head>
        <title>SCAN TO SEND</title>
    </head>
    <body>
        SET ORIGINAL ON ORIGINAL TABLE AND PRESS START KEY
        <from action="ScanStart" method="post"> <br/>
        RESOLUTION:
            <select name="resolution">
                <option value="0">100x100dpi</option>
                <option value="1">200x200dpi</option>
                <option value="2">300x300dpi</option>
                <option value="3">600x600dpi</option>
            </select>
        <br/>
        <input type="submit" value="START READING" name="start"/> <br/>
        </from>
    </body>
</html>
```

701 — `<from action="ScanStart" method="post">`
702 — `<select name="resolution">`
703 — `<input type="submit" value="START READING" name="start"/>`

FIG. 8

```
<html>
  <head>
    <title>SCAN TO SEND</title>
  </head>
  <body>
    IMAGE PREVIEW
    <from action="/SendStart" method="post">
      <img src="http://localhost/image/docprev?docid=xxx&sid=yyy"/>   ← 901
      <input type="submit" value="NEXT PAGE"/>
      IF THIS DATA CAN BE SENT, PRESS "START SENDING"
      <br/>
      <input type="submit" value="STOP"/>
      <input type="submit" value="START SENDING"/> <br/>
    </from>
  </body>
</html>
```

INFORMATION PROCESSING SYSTEM COMPRISING A SERVER APPARATUS AND AN INFORMATION PROCESSING APPARATUS CONSTRUCTING AN OPERATION SCREEN, CONTROL METHOD AND PROGRAM THEREOF

TECHNICAL FIELD

The present invention relates to an information processing system including a server and an information processing apparatus having a display unit for displaying an operation screen provided by the server, a control method thereof, and a program.

BACKGROUND ART

A method is known for connecting an information processing apparatus such as a PC to a Web server on a network and display, and for said Web server to provide an operation screen to a Web browser of the information processing apparatus. In this case, the Web browser of the information processing apparatus requests the operation screen of the Web server. In response to the request from the information processing apparatus, a Web application on the Web server transmits, to the information processing apparatus, an HTML file for displaying the operation screen on the Web browser. The Web browser of the information processing apparatus analyzes the received HTML file, and displays an operation screen based on the description of the received HTML file. When the user inputs an instruction via the operation screen displayed on the Web browser, the Web browser notifies the Web server of the input instruction. Upon receiving the notification, the Web application on the Web server executes processing in accordance with the input instruction.

Recently, even some MFPs (Multi Function Peripherals) each having a scanner and printer include the above-mentioned Web browser. For example, Japanese Patent Laid-Open No. 2006-127503 proposes a technique in which the Web server provides an operation screen for inputting an instruction to use each function of the MFP. More specifically, the user inputs an instruction via an operation screen displayed on the Web browser of the MFP, the Web server receives the notification, and requests the MFP to execute various processes in accordance with the contents of the instruction input from the user. Upon receiving the request, the MFP executes the requested processing. In this case, the MFP need not hold all menu data for operating the MFP, and even menu data can be easily changed on the Web server.

However, the conventional technique has the following problem. For example, in the conventional technique, to display information present in the MFP, the information must be temporarily transmitted from the MFP to the Web server. More specifically, when the Web server provides an operation screen for previewing an original image read by the MFP, the MFP transmits data of the read image to the Web server, and the Web browser of the MFP obtains and displays the operation screen containing the data. If the amount of data transmitted from the MFP to the Web server is large, this increases the network load or the response time until the operation screen is displayed. Information in the MFP may contain secret information. Transmitting such information to the Web server via the network is not preferable in terms of security.

SUMMARY OF INVENTION

The present invention enables realization of an information processing system which constructs an operation screen using data present in an information processing apparatus without transmitting the data to a server apparatus when the server apparatus provides the operation screen of the information processing apparatus, and a control method thereof.

One aspect of the present invention provides an information processing system comprising a server apparatus and an information processing apparatus being capable of using an external application provided by the server apparatus, the server apparatus including: reception means for receiving, from the information processing apparatus, information for obtaining data stored in the information processing apparatus; generation means for generating screen information for displaying an operation screen of the external application by using the information received by the reception means; and transmission means for transmitting the screen information generated by the generation means to the information processing apparatus, and the information processing apparatus including: response means for transmitting, to the server apparatus, the information for obtaining data; and display control means for, in accordance with the screen information transmitted by the transmission means, obtains the data stored in the information processing apparatus and displays the operation screen of the external application on a display means.

Another aspect of the present invention provides a method of controlling an information processing system including a server apparatus and an information processing apparatus being capable of using an external application provided by the server apparatus, the method comprising: causing the server apparatus to receive, from the information processing apparatus, information for obtaining data stored in the information processing apparatus; causing the information processing apparatus to transmit, to the server apparatus, the information for obtaining data; causing the server apparatus to generate screen information for displaying an operation screen of the external application by using the information received in the causing the server apparatus to receive information; causing the server apparatus to transmit, to the information processing apparatus, the screen information generated in the causing the server apparatus to generate screen information; and causing, in accordance with the screen information transmitted in the causing the server apparatus to transmit the screen information, the information processing apparatus to obtain the data stored in the information processing apparatus and display the operation screen of the external application on a display means.

Still another aspect of the present invention provides a program for causing a computer to execute the information processing system control method.

Yet still another aspect of the present invention provides a computer-readable storage medium storing a program for causing a computer to execute the information processing system control method.

Further features of the present invention will be apparent from the following description of exemplary embodiments with reference to the attached drawings.

BRIEF DESCRIPTION OF DRAWINGS

FIG. 2 is a block diagram showing the control configuration of the information processing system 100 according to the first embodiment;

FIG. 5 is a flowchart showing the operation sequence of a Web browser 540 according to the first embodiment;

FIG. 6 is a view exemplifying reading setting screen data of a Web application according to the first embodiment;

FIG. 8 is a view exemplifying read image preview screen data of the Web application according to the first embodiment;

DESCRIPTION OF EMBODIMENTS

Figure 1:
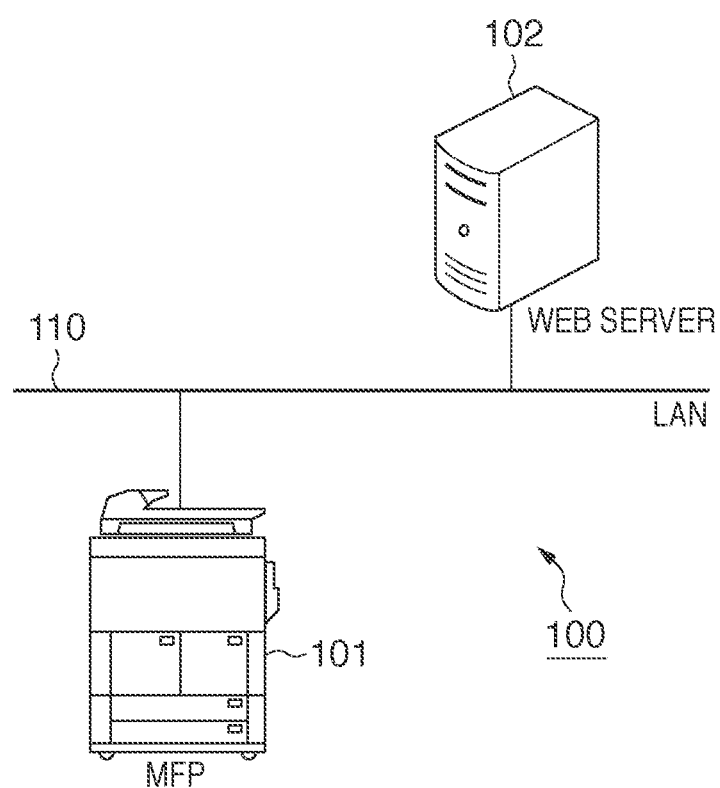
FIG. 1 is a view exemplifying the configuration of an information processing system 100 according to the first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Hardware Configuration of Information Processing System>

The first embodiment will be described with reference to FIGS. 1 to 12. The hardware configuration of the information processing system according to the first embodiment will be explained with reference to FIG. 1. An information processing system 100 includes an MFP 101 having a Web browser function, and a Web server 102 having a Web server function. These apparatuses are connected via a LAN 110 to be able to communicate with each other. Note that the MFP 101 is an example of an information processing apparatus, and the Web server 102 is an example of a server apparatus serving as an external apparatus. The MFP 101 can use a Web application (external application) which is executed using information provided from the Web server, and a native application which is executed using information held in advance.

The MFP 101 includes a display unit which displays the display screen of the Web application and that of the native application, and an operation unit having a plurality of hardware keys (to be referred to as hard keys). The display unit uses a touch panel type LCD, displays software keys, and can accept an input via the software keys (to be referred to as soft keys). An FTP (File Transfer Protocol) server (not shown) also exists on the LAN 110, and the MFP 101 can transmit image data to the FTP server by FTP.

<Control Configuration of Information Processing System>

The control configurations of the MFP 101 and Web server 102 will be explained with reference to FIG. 2. A control unit 210 including a CPU 211 comprehensively controls the MFP 101. The CPU 211 reads out a control program stored in a ROM 212, and executes various control processes such as reading control and transmission control. A RAM 213 is used as a temporary storage area such as a main memory or work area for the CPU 211. An HDD 214 stores image data, various programs, or various information tables (to be described later). An operation unit I/F 215 connects an operation unit 219 and the control unit 210. The operation unit 219 includes a liquid crystal display unit having a touch panel function, and a keyboard. The MFP 101 has a Web browser function (to be described later). The Web browser of the MFP 101 analyzes an HTML file received from the Web server 102 and displays, on the operation unit 219, an operation screen based on the description of the received HTML file. The operation unit 219 includes an LCD display unit whose LCD is covered with a touch panel sheet. The LCD display unit displays an operation screen provided by a native function module (to be described later) or the Web browser, and software keys. When the user presses a displayed key, the LCD display unit notifies the CPU 211 of position information indicating the pressed position.

A printer I/F 216 connects a printer 220 and the control unit 210. Image data to be printed by the printer 220 is transferred from the control unit 210 to the printer 220 via the printer I/F 216, and printed on a printing medium by the printer 220. A scanner I/F 217 connects a scanner 221 and the control unit 210. The scanner 221 is an example of a reading means. The scanner 221 reads an image on an original to generate image data, and outputs the image data to the control unit 210 via the scanner I/F 217. A network I/F 218 connects the control unit 210 to the LAN 110. The network I/F 218 transmits image data and information to a server apparatus (for example, the Web server 102) on the LAN 110, and receives various kinds of information from the server apparatus on the LAN 110.

The Web server 102 includes a CPU 411 which comprehensively controls the Web server 102. The CPU 411 reads out a control program stored in a ROM 412, and executes various control processes. A RAM 413 is used as a temporary storage area such as a main memory or work area for the CPU 411. An HDD 414 stores image data, various programs, or various information tables. A network I/F 415 connects a control unit 410 to the LAN 110. The network I/F 415 transmits/receives various kinds of information to/from another apparatus on the LAN 110.

<Arrangement of Operation Unit>

Figure 3:
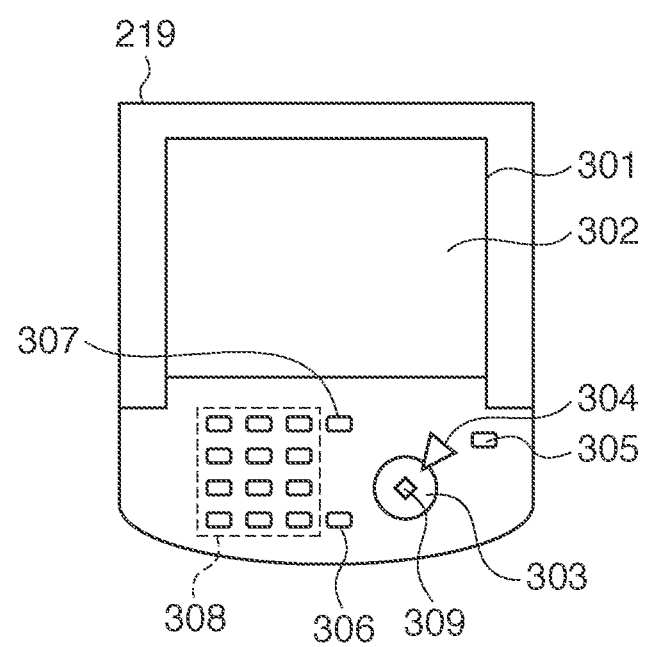
FIG. 3 is a view exemplifying the arrangement of an operation unit 219 of an MFP 101 according to the first embodiment.

The arrangement of the operation unit 219 will be explained with reference to FIG. 3. The operation unit 219 has an LCD display unit 301 whose LCD is covered with a touch panel sheet 302. The LCD display unit 301 displays an operation screen provided by the native function module (to be described later) or the Web browser, and soft keys. When the user presses a displayed key, the LCD display unit 301 notifies the CPU 211 of position information indicating the pressed position.

The operation unit 219 includes various hard keys such as a start key 303, stop key 304, reset key 305, guide key 306, top menu key 307, and numeric keys 308. The start key 303 is used to designate the start of processing in the MFP 101. An LED display portion 309 in two, green and red colors is arranged at the center of the start key 303. The two-color LED display portion 309 represents by its color whether the start key 303 is available. The stop key 304 is used to stop the current operation. The reset key 305 is used to initialize settings. The guide key 306 is used to display the usage of the MFP 101. The top menu key 307 is used to display a top menu screen for selecting the function of the MFP 101. The numeric keys 308 are used to input numerical values.

<Functional Configuration of Information Processing System>

Figure 4:
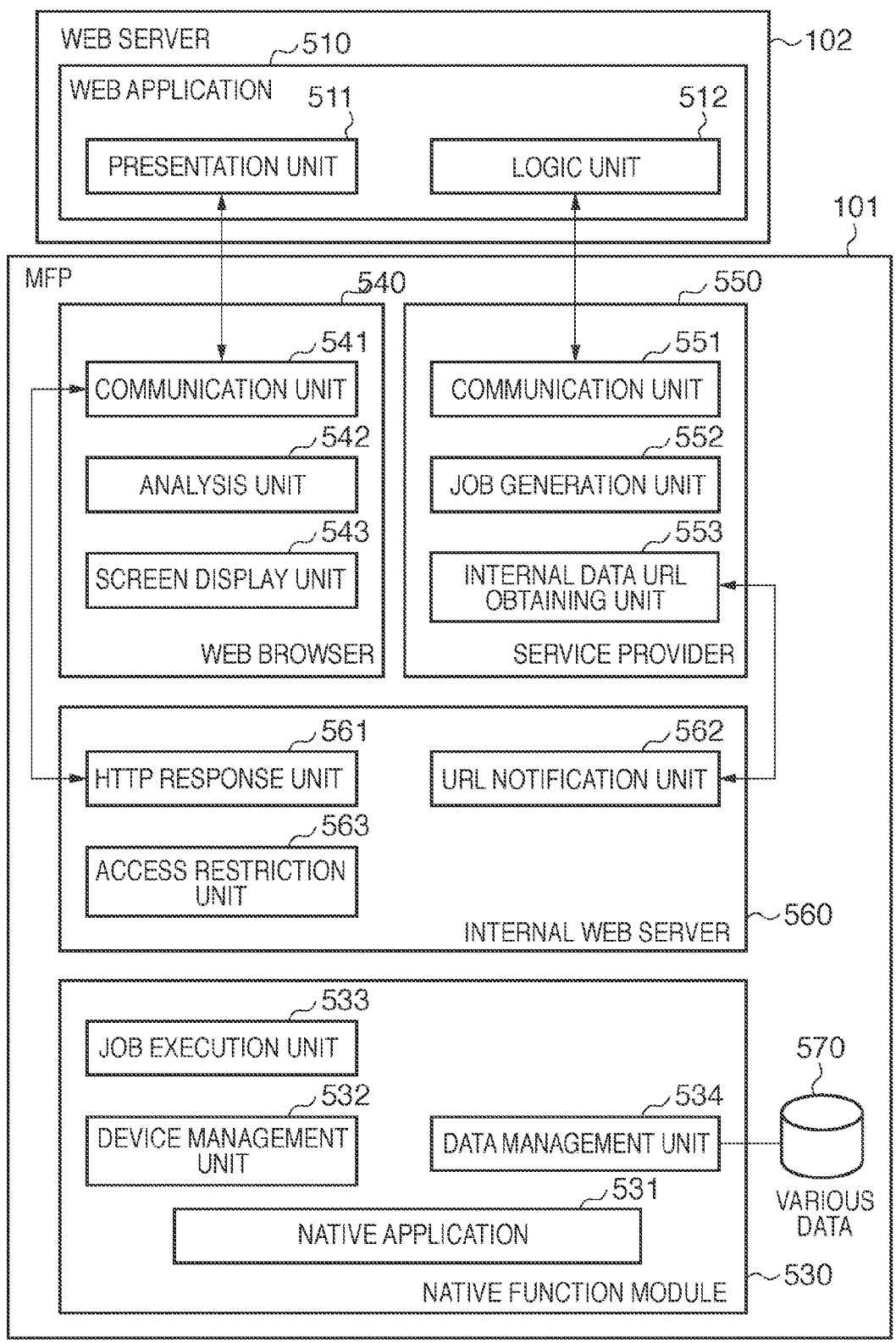
FIG. 4 is a block diagram showing the functional configuration of the information processing system 100 according to the first embodiment.

The functional configuration of the information processing system 100 will be explained with reference to FIG. 4. The following functional configuration can be implemented by software, hardware, or a combination of them. Some of functional units to be described below are implemented by, for example, executing control programs by the CPU 211 of the MFP 101 and the CPU 411 of the Web server 102.

The MFP 101 includes a native function module 530, Web browser 540, service provider 550, and internal Web server 560. The Web server 102 includes a Web application 510. The Web application 510 includes a presentation unit 511 and logic unit 512.

The functional configuration of the MFP 101 will be described. The Web browser 540 includes a communication unit 541, analysis unit 542, and screen display unit 543. The communication unit 541 communicates with the presentation unit 511 of the Web application 510 and the internal Web server 560 in accordance with the HTTP protocol. More specifically, the communication unit 541 requests/receives, of/from the Web application 510, the content of an operation screen to be displayed on the Web browser 540. If the operation screen content received from the Web application 510 contains a link instruction of data to be obtained from the internal Web server 560 as a result of analysis by the analysis unit 542 (to be described later), the communication unit 541 communicates with the internal Web server 560. The communication unit 541 requests/receives the data of/from the internal Web server 560. Further, the communication unit 541 notifies the Web application 510 of an instruction which is input by the user via an operation screen displayed on the Web browser 540.

The analysis unit 542 analyzes an operation screen content received from the Web application 510 or internal Web server 560. This content is formed from an HTML file, image file, script file, and the like. These files contain descriptions indicating the contents of an operation screen to be displayed on the operation unit 219. The screen display unit 543 displays an operation screen on the operation unit (display unit) 219 based on the result of analysis by the analysis unit 542.

The service provider 550 includes a communication unit 551, job generation unit 552, and internal data URL obtaining unit 553. The communication unit 551 accepts a processing request from the logic unit 512 in the Web application 510. When the processing request accepted from the Web application 510 is execution of a job, the job generation unit 552 generates a job (Web application) for executing the requested processing. When the processing request accepted from the Web application 510 is internal data URL obtaining processing, the internal data URL obtaining unit 553 inquires a URL (Uniform Resource Locator) of a URL notification unit 562 of the internal Web server 560. The URL notification unit 562 sends back a URL for obtaining the requested internal data from the internal Web server 560. The URL is information indicating the storage destination of target data.

The native function module 530 includes a native application 531, device management unit 532, job execution unit 533, and data management unit 534. The native application 531 includes various applications which are provided not from the Web server 102 but based on a program held in the MFP 101. For example, the native application 531 includes applications for executing printing processing by the printer 220 of the MFP 101 and reading processing by the scanner 221. The job execution unit 533 executes the native application 531 or a job (Web application) generated by the job generation unit 552 of the service provider 550.

The device management unit 532 manages the error state of each module in the device, and if an error occurs, notifies the Web browser 540 and service provider 550 of the error information. The device management unit 532 also performs setting of the overall MFP 101 and application switching processing. The data management unit 534 manages various data 570 stored in the HDD 214. Data managed by the data management unit 534 includes image data which is read by the scanner 221 or received via the LAN 110, address data used when performing transmission processing by the MFP 101, various setting data of the MFP 101, and history data. For example, when the scanner 221 reads an original, the data management unit 534 stores the image data in the HDD 214, assigns an ID to the data, and manages the data. If the data management unit 534 receives a request from the job execution unit 533 or internal Web server 560, it reads out data having a designated ID from the HDD 214, and provides it. Image data managed by the data management unit 534 include image data permanently held for reuse, and image data which is read by the scanner 221 and temporarily held before performing processing such as transmission.

The internal Web server 560 includes an HTTP response unit 561, the URL notification unit 562, and an access restriction unit 563. The HTTP response unit 561 sends back a response to a request based on the HTTP protocol from the Web browser 540 or a Web browser running on a PC (not shown) on the LAN 110. At this time, if the requested URL is the URL of data managed by the data management unit 534, the HTTP response unit 561 requests the data management unit 534 to read out the data and send it back. In response to a request from the internal data URL obtaining unit 553, the URL notification unit 562 sends back a URL character string to be designated when obtaining the requested internal data from the internal Web server 560. When the HTTP response unit 561 receives a request based on the HTTP protocol, the access restriction unit 563 determines whether to accept the request and send back a response.

The functional configuration of the Web server 102 will be described. The presentation unit 511 communicates with the communication unit 541 to transmit, to the MFP 101, the content of an operation screen to be displayed on the Web browser 540 of the MFP 101 in response to a request from the MFP 101. The operation screen content may be a file held in advance in the Web server 102, or data generated in response to a request upon receiving the request. When generating an operation screen content in response to a request from the MFP 101, the logic unit 512 can also request the URL of internal data of the internal data URL obtaining unit 553, and generate an operation screen content to contain the obtained URL. The presentation unit 511 receives, from the MFP 101, an instruction which is input by the user via an operation screen displayed on the Web browser 540 of the MFP 101.

Upon receiving an instruction from the user, the Web application 510 executes various processes in accordance with the contents of the instruction. The Web application 510 requests the MFP 101 to execute processing in accordance with the contents of the instruction from the Web browser. More specifically, the Web application 510 requests execution of printing processing by the printer 220 of the MFP 101, execution of reading processing by the scanner 221, or execution of transmission processing via the network I/F 218. In this manner, when requesting the MFP 101 to execute processing, the logic unit 512 requests the job generation unit 552 via the communication unit 551 in the service provider 550 of the MFP 101 to generate a job.

As described above, in the information processing system 100 according to the first embodiment, the MFP 101 and the Web server 102 transmit/receive not image data or the like but information indicating the storage destination (for example, URL) of the image data or the like. For example, the Web application can construct an operation screen for displaying image data held in the MFP 101 without increasing the network load. Detailed control when constructing the above-described operation screen will be explained below.

<Scan to Send Processing>

The operation of a job by the Web application 510 to scan an original set on the original platen by the MFP 101 and send the scanned data to a specific FTP server on the network by the FTP protocol will be described. In this job, the MFP 101 displays image data of a scanned original on the operation unit 219, and after the user confirms it, executes FTP transmission.

A series of operations in the Web browser 540 when obtaining an operation screen by the MFP 101 from the Web application 510, displaying it, reading an original in accordance with a start instruction from the user, and transmitting the data to a specific FTP server will be explained with reference to FIG. 5. The following processing is executed by executing a control program by the CPU 211 of the MFP 101.

In step S601, the communication unit 541 requests, of the presentation unit 511 of the Web server 102, a reading setting screen serving as the first screen of the Web application 510. More specifically, the communication unit 541 communicates with the URL of the Web application 510 in accordance with the HTTP protocol. The URL may be one set in advance as the homepage of the Web browser 540 or the like, one input by the user to the URL input field of the Web browser 540, or one obtained by selecting, by the user, the link of a screen currently displayed on the Web browser 540. After that, the communication unit 541 receives reading setting screen data as a response from the Web application 510. The analysis unit 542 analyzes the received Web application screen data. Based on the analysis result, the screen display unit 543 displays a Web application screen on the LCD display unit 301.

Figure 7:
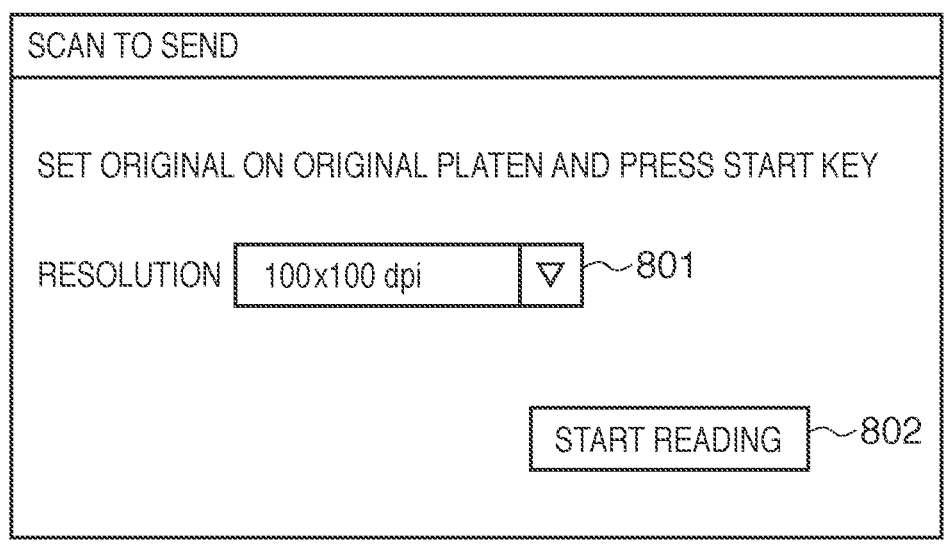
FIG. 7 is a view exemplifying the reading setting screen of the Web application according to the first embodiment.

Web application screen data received in step S601, and a display screen will be exemplified with reference to FIGS. 6 and 7. FIG. 7 shows a screen displayed on the LCD display unit 301 in step S601 upon receiving screen data shown in FIG. 6.

At a form start tag 701, the action attribute and method attribute indicate that, when a submit instruction is received, this form is transmitted by the POST method for /ScanStart. A select element 702 designates the reading resolution, and the Web browser 540 draws the select element 702 as a pull-down menu 801 shown in FIG. 7. The Web browser 540 draws a submit element 703 as a submit button 802 shown in FIG. 7.

Referring back to FIG. 5, in step S602, the Web browser 540 determines whether the user has pressed the reading start button 802. If the Web browser 540 determines that the user has pressed the reading start button 802, the process advances to step S603. In step S603, the communication unit 541 transmits a reading start instruction to the Web server 102, and the process advances to step S604. More specifically, the communication unit 541 transmits data of this form based on the description of the form start tag 701 of the screen data shown in FIG. 6 to the "ScanStart" URL of the Web application 510 by the HTTP protocol. At this time, even resolution designation selected in the pull-down menu 801 is transmitted as a query parameter to the Web application 510. In step S604, the communication unit 541 receives preview screen data as a response from the Web application 510. In step S605, the analysis unit 542 analyzes the received data.

Figure 9:
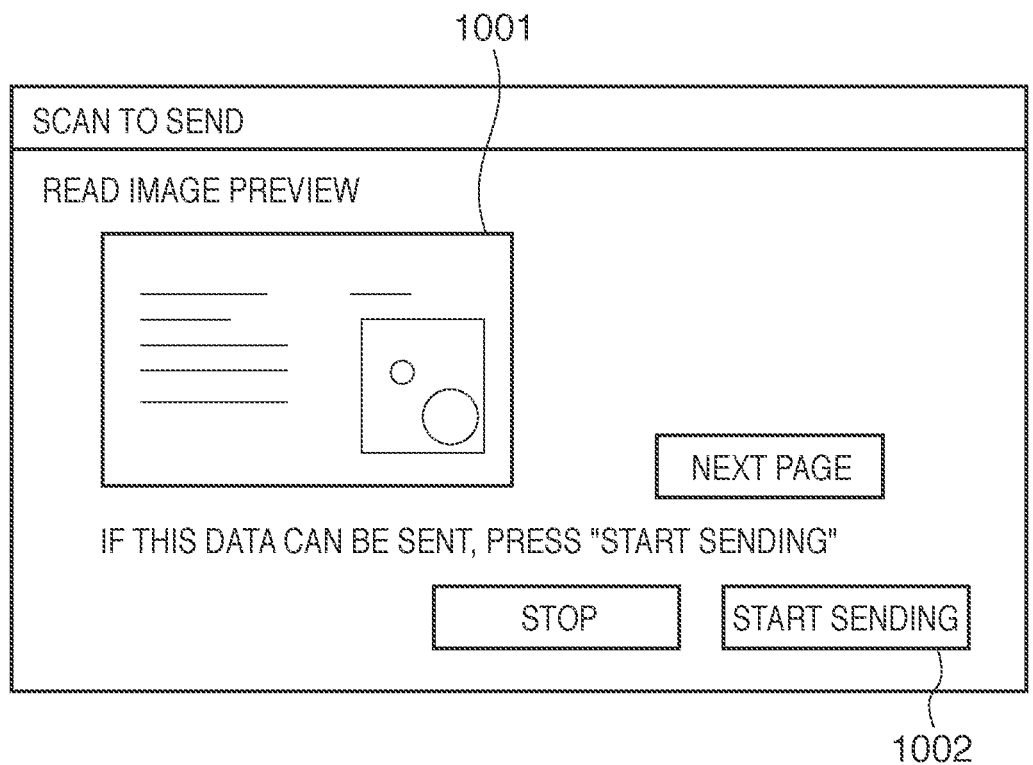
FIG. 9 is a view exemplifying the read image preview screen of the Web application according to the first embodiment.

Preview screen data received in step S604, and a display screen will be exemplified with reference to FIGS. 8 and 9. FIG. 9 shows a screen displayed on the LCD display unit 301 in step S608 (to be described later) upon receiving screen data shown in FIG. 8.

In an img tag 901, the src attribute designates the URL of data to be displayed as image data. In this example, the URL indicated by the src attribute is "http://localhost/image/docprev?docid=xxx&sid=yyy". "localhost" is information indicating a local apparatus on the network. That is, the img tag 901 indicates that data is to be obtained from the internal Web server 560.

If the above-mentioned img tag is detected as a result of analysis performed in step S605, the communication unit 541 transmits, to the internal Web server 560, a data obtaining request for the URL indicated by the src attribute of the img tag 901 in step S606. In step S607, the communication unit 541 receives internal data from the internal Web server 560 as a response to the request in step S606, and then the process advances to step S608. In step S608, the screen display unit 543 displays a preview screen shown in FIG. 9 on the LCD display unit 301 based on the data received in step S604 and the data received in step S607.

As shown in FIG. 9, a portion 1001 corresponds to the description of the img tag 901, and is image data obtained from the internal Web server 560. In other words, this image data is image data scanned by the MFP 101. A button 1002 is used to send image data represented at the portion 1001 to a specific FTP server on the network by the FTP protocol. In this way, the Web browser 540 can display, as one operation screen, a combination of screen data obtained from the Web application 510 and data obtained from the internal Web server 560.

In step S609, the Web browser 540 determines whether the user has pressed the button 1002. If the Web browser 540 determines that the user has pressed the button 1002, the communication unit 541 transmits a sending start instruction to the Web application 510 in step S610, and the process advances to step S611. In step S611, the screen display unit 543 receives and displays a screen indicating the sending result as a response to the instruction in step S610.

Figure 10:
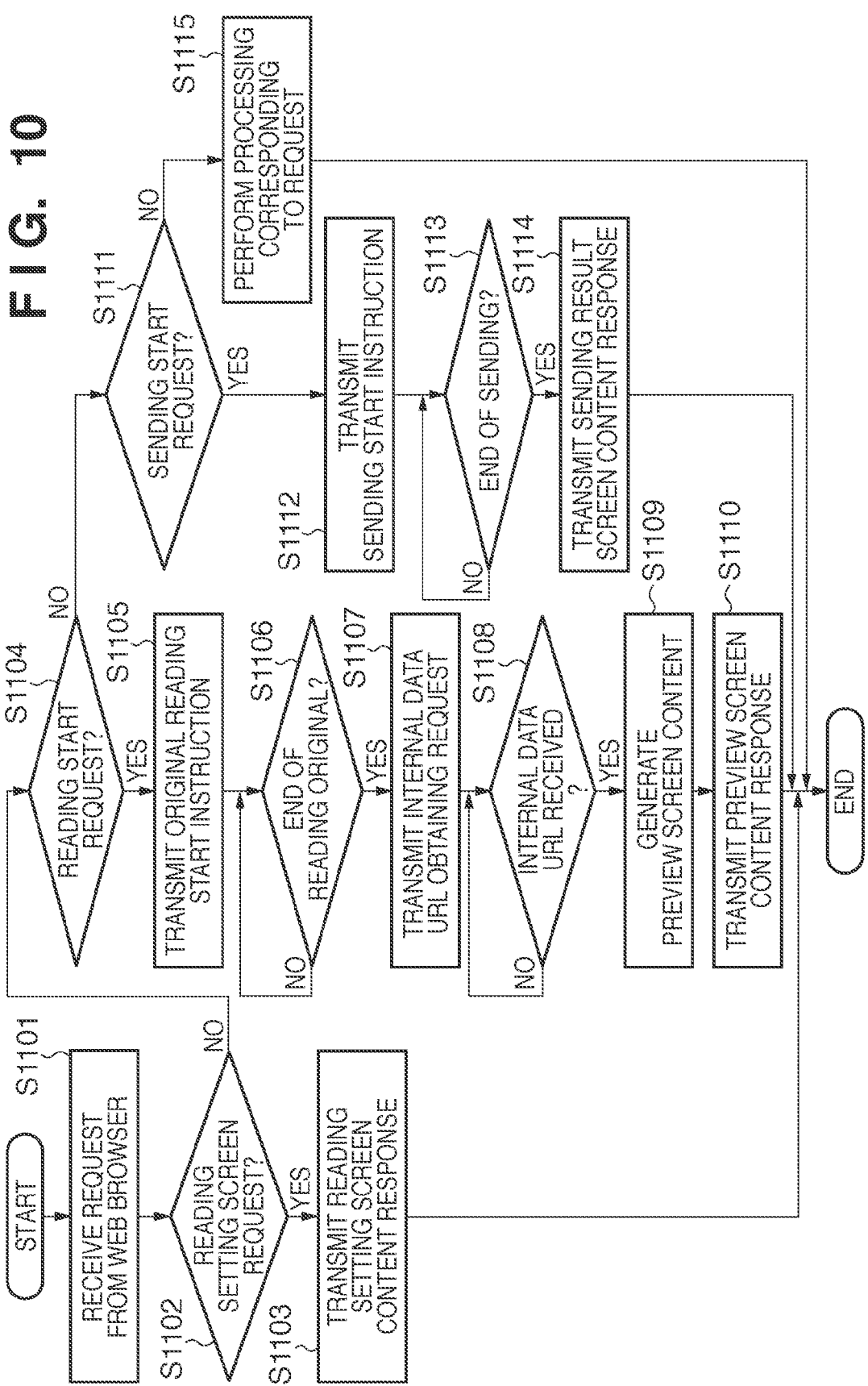
FIG. 10 is a flowchart showing the operation sequence of a Web server 102 according to the first embodiment.

A series of operations executed in the Web server 102 when the Web browser 540 of the MFP 101 executes the sequence shown in FIG. 5 will be explained with reference to FIG. 10. The following processing is implemented by executing a control program by the CPU 411 of the Web server 102.

In step S1101, the presentation unit 511 receives a request from the Web browser 540. In step S1102, the presentation unit 511 determines whether the received request is a reading setting screen obtaining request. In this determination, it is determined whether the requested URL is the URL of a reading setting screen. If the presentation unit 511 determines that the received request is a reading setting screen request (YES in step S1102), the process advances to step S1103; if NO, to step S1104. The reading setting screen is a setting screen for setting conditions when reading an original by the MFP 101.

In step S1103, the presentation unit 511 transmits the content (screen data) of the reading setting screen as a response, and the process ends. Note that the Web server 102 executes the processes in steps S1101 to S1103 in correspondence with the process of step S601 by the Web browser 540, and the response in step S1103 is data shown in FIG. 6.

If the presentation unit 511 determines in step S1102 that the received request is not a reading setting screen request, it determines in step S1104 whether the received request is a reading start request. In this determination, it is determined whether the requested URL is the URL of a reading start request. If the presentation unit 511 determines that the received request is a reading start request (YES in step S1104), the process advances to step S1105; if NO, to step S1111. The start of reading means the start of original reading processing in the MFP 101.

In step S1105, the logic unit 512 transmits an instruction to the service provider 550 to read an original, and waits for a response from the service provider 550. In step S1106, the logic unit 512 determines whether it has received a reading end response from the service provider 550. If the logic unit 512 determines in step S1106 that it has received a reading end response, the process advances to step S1107. Note that the received reading end response contains ID information for specifying read data. In step S1107, the logic unit 512 transmits, to the service provider 550, a URL obtaining request for obtaining read image data from the internal Web server 560. More specifically, the logic unit 512 designates the ID received in step S1106, and issues a URL obtaining request to the service provider 550.

In step S1108, the logic unit 512 determines whether it has received a response to the URL obtaining request from the service provider 550. The response to the URL obtaining request from the service provider is, for example, a character string such as "/image/docprev?docid=xxx&sid=yyy". In step S1109, the presentation unit 511 generates a preview screen content as a response to the Web browser 540. The preview screen content contains the URL character string obtained in step S1108.

In step S1110, the presentation unit 511 transmits the generated screen content as a response to the request from the Web browser 540. Note that the processes in steps S1104 to S1110 are executed in correspondence with the processes of steps S603 and S604 by the Web browser 540. The response which is generated in step S1109 and transmitted in step S1110 is data shown in FIG. 8.

If the presentation unit 511 determines in step S1104 that the received request is not a reading start request, it determines in step S1111 whether the received request is a sending start instruction. In this determination, it is determined whether the requested URL is the URL of a sending start instruction. If the presentation unit 511 determines that the received request is a sending start instruction (YES in step S1111), the process advances to step S1112; if NO, to step S1115. Note that the sending start instruction indicates the start of processing of transmitting image data read by the MFP 101 to a predetermined server by the FTP protocol.

In step S1112, the logic unit 512 transmits an instruction to the service provider 550 to transmit a read image to a predetermined server by the FTP protocol. In step S1113, the logic unit 512 determines whether it has received a sending end response from the service provider. If the logic unit 512 determines in step S1113 that it has received a sending end response, the process advances to step S1114, and the presentation unit 511 transmits screen information indicating the sending result as a response to the request from the Web browser 540. Note that the processes in step S1111 to S1114 are executed in correspondence with the processes of step S610 and S611 by the Web browser 540. If the logic unit 512 determines in step S1111 that the received request is not a sending start instruction, the Web application 510 performs processing corresponding to the request in step S1115.

Figure 11:
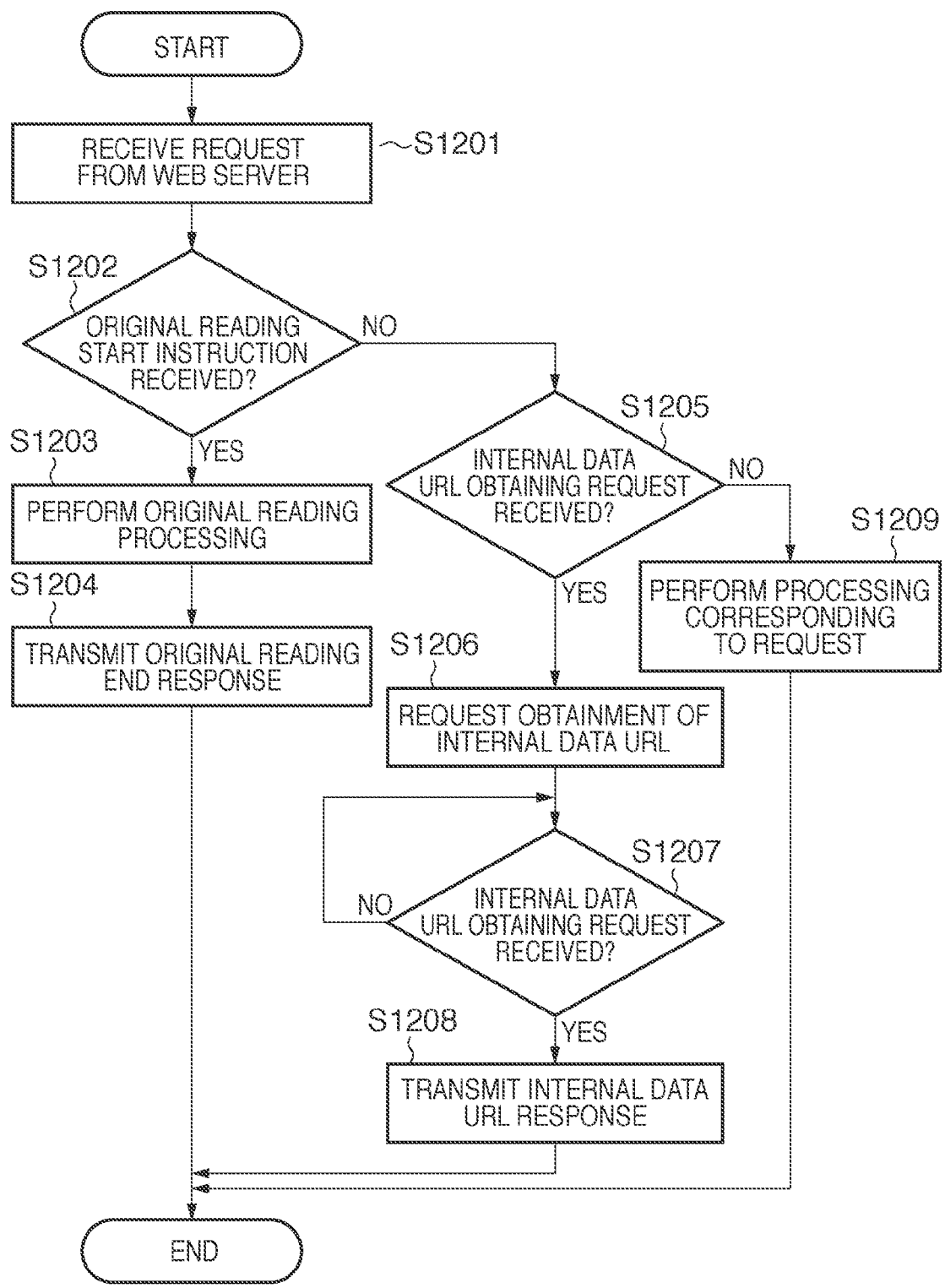
FIG. 11 is a flowchart showing the operation sequence of a service provider 550 according to the first embodiment.

The operation of the service provider 550 will be explained with reference to FIG. 11. The following processing is executed by executing a control program by the CPU 211 of the MFP 101.

In step S1201, the communication unit 551 receives a request from the Web server 102. In step S1202, the service provider 550 determines whether the received request is a reading start instruction request. If the service provider 550 determines that the received request is a reading start instruction, the process advances to step S1203, and the service provider 550 executes original reading processing. More specifically, the job generation unit 552 generates a scan job, and requests the job execution unit 533 to execute the job. The job execution unit 533 operates the scanner 221 via the scanner I/F 217 to perform original reading processing.

After that, the data management unit 534 stores the read image data as various temporary data (image data in this case) 570 in the HDD of the MFP 101. The data management unit 534 generates an image ID and manages the read image data. After the end of reading processing, the communication unit 551 transmits a response to the Web server 102 in step S1204, and then the process ends. The image ID information of the read image data is assigned to the response. Note that the processes in step S1201 to S1204 are performed in response to transmission of a request from the Web server 102 in step S1105.

If the service provider 550 determines in step S1202 that the received request is not a reading start instruction, the process advances to step S1205, and the service provider 550 determines whether the received request is an internal data URL obtaining request. If the service provider 550 determines that the received request is an internal data URL obtaining processing request, the process advances to step S1206, and the service provider 550 requests obtainment of an internal data URL. More specifically, the internal data URL obtaining unit 553 designates an image ID, and requests, of the URL notification unit 562 of the internal Web server 560, a URL for obtaining an image having the image ID via the internal Web server 560.

In step S1207, the service provider 550 determines whether it has received a response to the URL obtaining request. If the service provider 550 has received the response, the process advances to step S1208, the communication unit 551 transmits a response to the Web server 102, and the process ends. Note that the processes in step S1205 to S1208 are performed in response to transmission of a request from the Web server 102 in step S1107. If the service provider 550 determines in step S1205 that the received request is not an internal data URL obtaining processing request, the process advances to step S1209 to perform processing corresponding to the request, and then ends.

The operation of the internal Web server 560 will be explained with reference to FIG. 12. The following processing is implemented by executing a control program by the CPU 211 of the MFP 101.

In step S1301, the internal Web server 560 determines whether it has received a URL obtaining request from the internal data URL obtaining unit 553 of the service provider 550. If the internal Web server 560 determines that it has received a URL obtaining request, the process advances to step S1302, and the URL notification unit 562 sends back a URL for obtaining, via the internal Web server 560, data having an image ID for which the obtaining request has been received, and then the process ends. Note that the processes in step S1301 and S1302 are performed in response to a request from the service provider 550 in step S1206.

If the internal Web server 560 determines in step S1301 that it has not received a URL obtaining request, the process advances to step S1303, and the internal Web server 560 determines whether it has received an internal data obtaining request from the Web browser 540. If the internal Web server 560 determines that it has received an internal data obtaining request, the process advances to step S1304, and the internal Web server 560 reads out target image data. More specifically, the internal Web server 560 requests the data management unit 534 to read out target data from the various data 570. In step S1305, the HTTP response unit 561 transmits the readout data to the Web browser 540 as a response to the internal data obtaining request, and then the process ends. Note that the processes in step S1303 to S1305 are executed in response to a request from the Web browser 540 in step S606. If the internal Web server 560 determines in step S1303 that it has not received an internal data obtaining request, the process advances to step S1306, and the internal Web server 560 performs processing corresponding to the request and sends back a response. Then, the process ends.

In an instruction to obtain the various data 570 in the MFP 101 from the internal Web server 560, no URL may be directly embedded in the content. For example, the internal Web server 560 may send back, to the Web browser 540, a script containing data indicating the ID of the various data 570 in the MFP 101. In this case, the analysis unit 542 of the Web browser 540 can analyze the script, and read out target data from the various data 570 in the MFP 101.

As described above, in the information processing system 100 according to the first embodiment, when the Web server 102 constructs the operation screen of an external application using data stored in the MFP 101, only storage destination information of the data can be transmitted/received between the two apparatuses. The first embodiment is effective when, for example, the external application executes scan processing using the MFP 101, displays the read image data on the operation unit, and transmits the image data by FTP in accordance with an instruction from the user. Even in this case, the first embodiment can execute the above-described job by transmitting/receiving only storage destination information of image data read by the MFP 101 without transmitting/receiving the image data between the MFP 101 and the Web server 102. Hence, the information processing system 100 can prevent an increase in network load and a decrease in operation screen display response. Since no secret information need be transmitted, security can be maintained.

Second Embodiment

Figure 13:
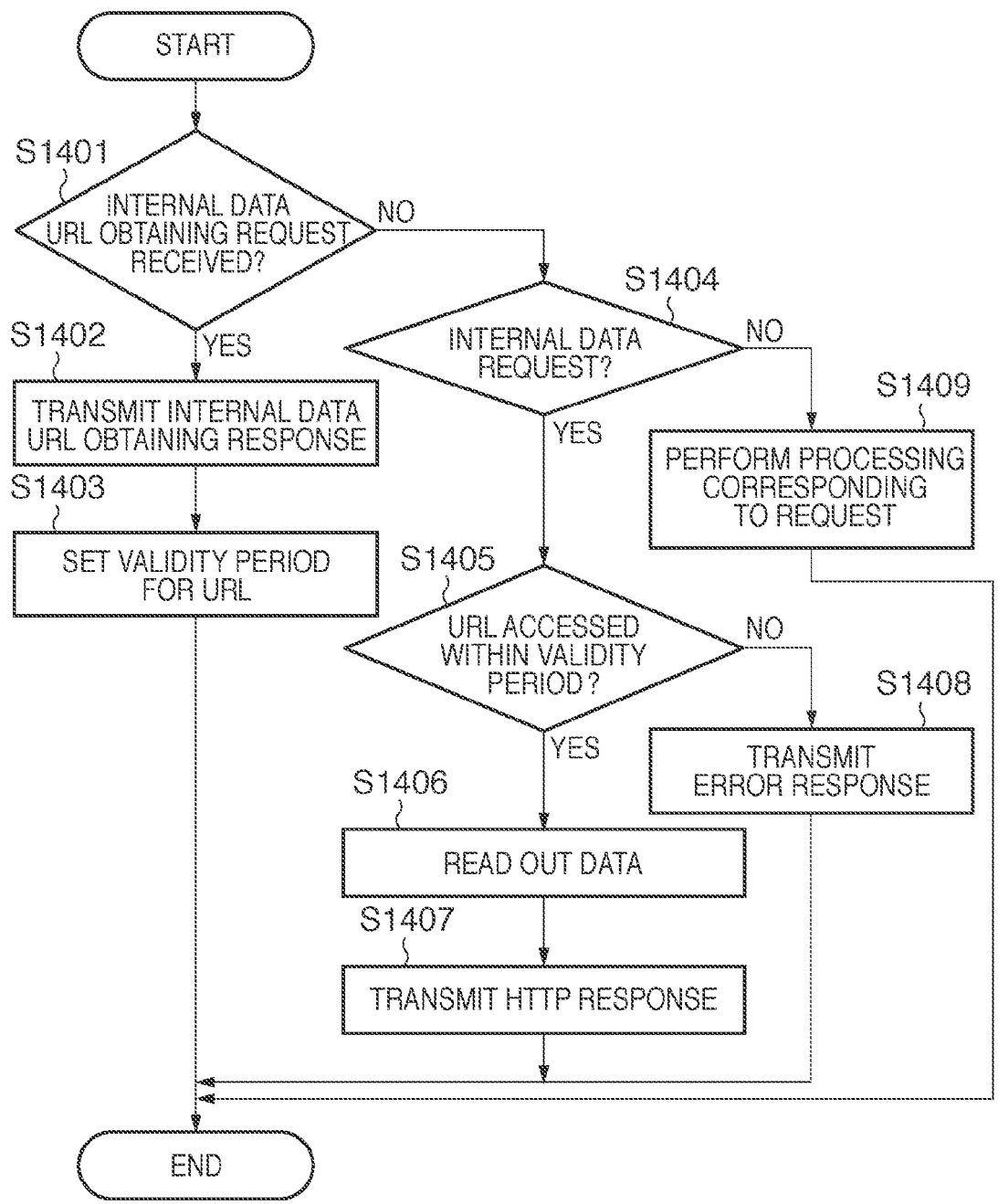
FIG. 13 is a flowchart showing the operation sequence of an internal Web server 560 according to the second embodiment.

The second embodiment will be described with reference to FIG. 13. The second embodiment further restricts obtainment of internal data in each configuration described in the first embodiment. The configuration of the second embodiment is the same as that of the first embodiment except for processing by an internal Web server 560, and a description thereof will not be repeated. The operation of the internal Web server 560 in the second embodiment will be explained with reference to FIG. 13. The following processing is executed by executing a control program by a CPU 211 of an MFP 101.

Figure 12:
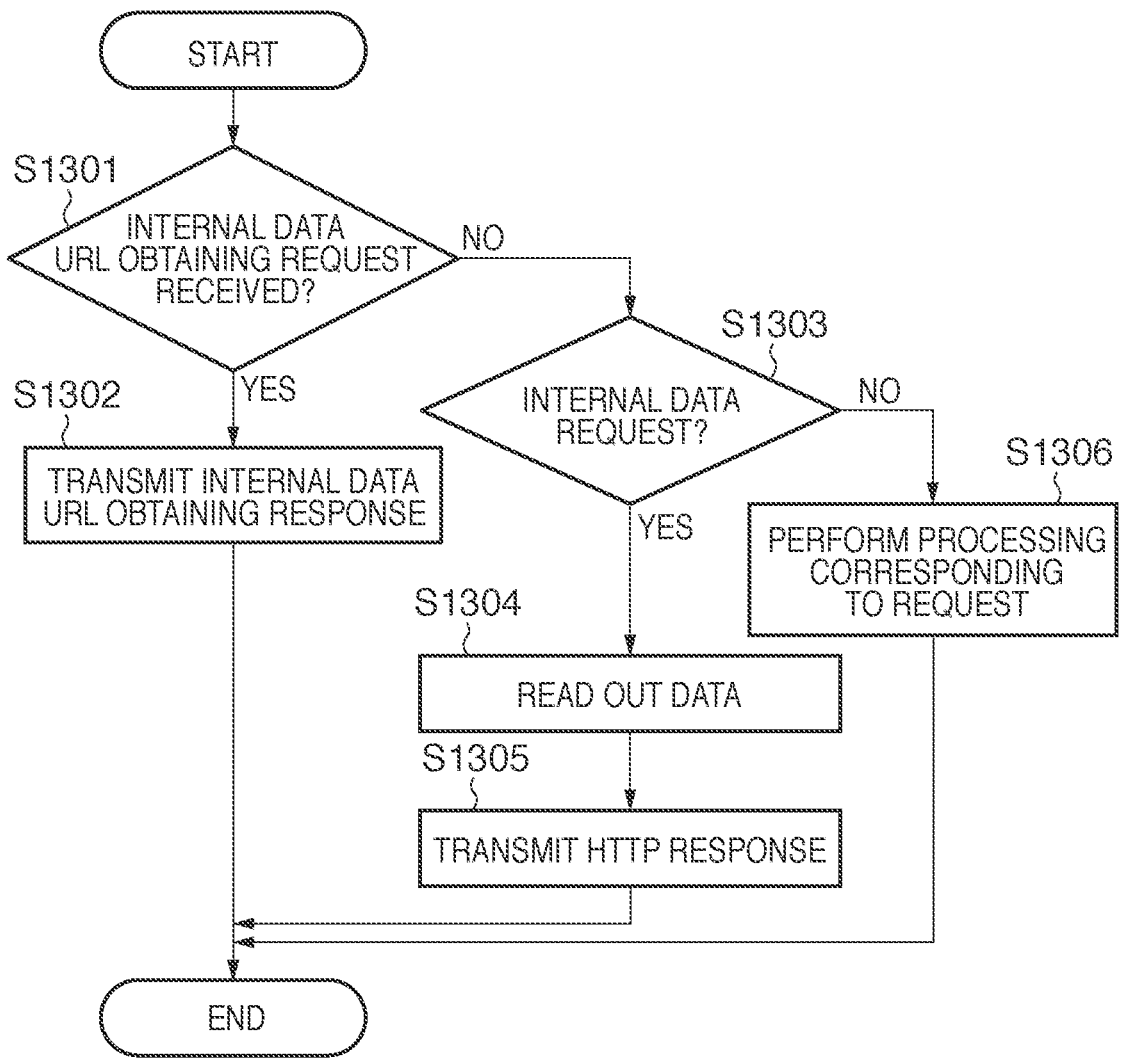
FIG. 12 is a flowchart showing the operation sequence of an internal Web server 560 according to the first embodiment.

The processes in step S1401 and S1402 are the same as those in step S1301 and S1302 of FIG. 12, and a description thereof will not be repeated. In step S1403, the internal Web server 560 sets the validity period for a URL sent back as a response. More specifically, the time obtained by adding a predetermined URL validity period (for example, 10 sec) to the time of response in step S1402 is held in the internal Web server 560 as the validity period for a URL sent back as a response.

In step S1404, the internal Web server 560 determines whether it has received an internal data obtaining request from a Web browser 540. If the internal Web server 560 determines that it has received an internal data obtaining request, the process advances to step S1405, and an access restriction unit 563 determines the validity period of the URL. More specifically, it is determined whether the URL has been accessed within the validity period held in step S1403. If the access restriction unit 563 determines that the URL has been accessed within the validity period, it permits the access to internal data, and the process advances to step S1406 and S1407 which are the same processes as those in step S1304 and S1305. If the access restriction unit 563 determines in step S1405 that the URL has not been accessed within the validity period, the process advances to step S1408, and the internal Web server 560 transmits, as a response, an error indicating that the validity period has expired. The process in step S1409 when it is determined in step S1404 that no internal data obtaining request has been received is the same as that in step S1306, and a description thereof will not be repeated.

As described above, in the second embodiment, an access to a URL is validated only during a predetermined period after a response to a URL obtaining request. A Web server 102 obtains the URL of internal data and transmits a content containing the obtained URL to the Web browser 540, and the Web browser 540 obtains the internal data. The series of processes is executed within a short time, so the URL is accessed within the validity period. Even if Web browser 540 or a Web browser running on a PC on a LAN 110 is to directly obtain internal data, it cannot access the internal data within the validity period and thus cannot obtain the internal data from the Web browser. The second embodiment can therefore enhance the security of internal data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-128274 filed on Jun. 3, 2010, which is hereby incorporated by reference herein in its entirety.

The invention claimed is:

1. An image reading system comprising:
(A) a server apparatus including:
  (a) an instruction unit that instructs an image reading apparatus to read an original, the instruction causing the image reading apparatus (1) to generate image data, and (2) to store the image data in the image reading apparatus;

(b) a reception unit that receives a response to the instruction from the image reading apparatus, without receiving the image data;

(c) a generation unit that generates, in a case where the response received by the reception unit includes a URL corresponding to image data stored in the image reading apparatus, screen information for displaying a preview screen of the image data stored in the image reading apparatus, in which the URL received by said reception unit is included, and generates, in a case where the response received by the reception unit does not include the URL, screen information corresponding to the response received by the reception unit; and (d) a screen information transmission unit that transmits the screen information generated by said generation unit to the image reading apparatus, and (B) the image reading apparatus including:

(i) a reading unit that reads the original and generates the image data based on the instruction by said instruction unit;

(ii) a storing unit that stores the image data generated by said reading unit;

(iii) a response transmission unit that transmits, to the server apparatus, the response, without transmitting the image data; and (iv) a display control unit that (a) in a case where the screen information received from the server includes the URL, obtains the image data stored in the storing unit based on the URL included in the received screen information, combines the screen information with the obtained image data into the preview screen, and displays the preview screen including an image of the original read by the reading unit, and (b) in a case where the screen information received from the server does not include the URL, displays a screen in accordance with the received screen information.

2. The image reading system according to claim 1, wherein the image reading apparatus further comprises a Web server; and said display control unit comprises a request unit that requests the image data corresponding to the URL included in the received screen information of the Web server.

3. The image reading system according to claim 2, wherein said request unit comprises a Web browser.

4. The image reading system according to claim 1, wherein the image reading apparatus further comprises an image data transmission unit that transmits the image data stored in said storing unit based on an operation from a user via the preview screen.

5. The image reading system according to claim 1, wherein the image reading apparatus further comprises a setting unit that sets a validity period to the URL corresponding to the image data stored in said storing unit.

6. A method in an image reading system comprising a server apparatus and an image reading apparatus, the method comprising the steps of:

instructing, by the server apparatus, the image reading apparatus to read an original;

reading, by the image reading apparatus, the original and generating image data based on the instruction;

storing, by the image reading apparatus, the generated image data;

transmitting, by the image reading apparatus, a response to the instruction to the server apparatus, without transmitting the image data;

receiving, by the server apparatus, the response from the image reading apparatus, without receiving the image data;

generating, by the server apparatus, in a case where the received response includes a URL corresponding to image data stored in the image reading apparatus, screen information for displaying a preview screen of the image data, in which the received URL is included, and generates, in a case where the received response does not include the URL, screen information corresponding to the received response; and transmitting, by the server apparatus, the generated screen information to the image reading apparatus;

receiving, by the image reading apparatus, the generated screen information transmitted from the server apparatus;

in a case where the screen information received from the server includes the URL, obtaining, by the image reading apparatus, the stored image data based on the URL included in the received screen information, combining the screen information with the obtained image data into the preview screen, and displaying, by the image reading apparatus, the preview screen including an image of the original read by the reading unit; and in a case where the screen information received from the server does not include the URL, displaying, by the image reading apparatus, a screen in accordance with the received screen information.

7. A non-transitory computer-readable storage medium storing a program for causing a computer to execute the method defined in claim 6.

* * * * *